Patented Feb. 9, 1954

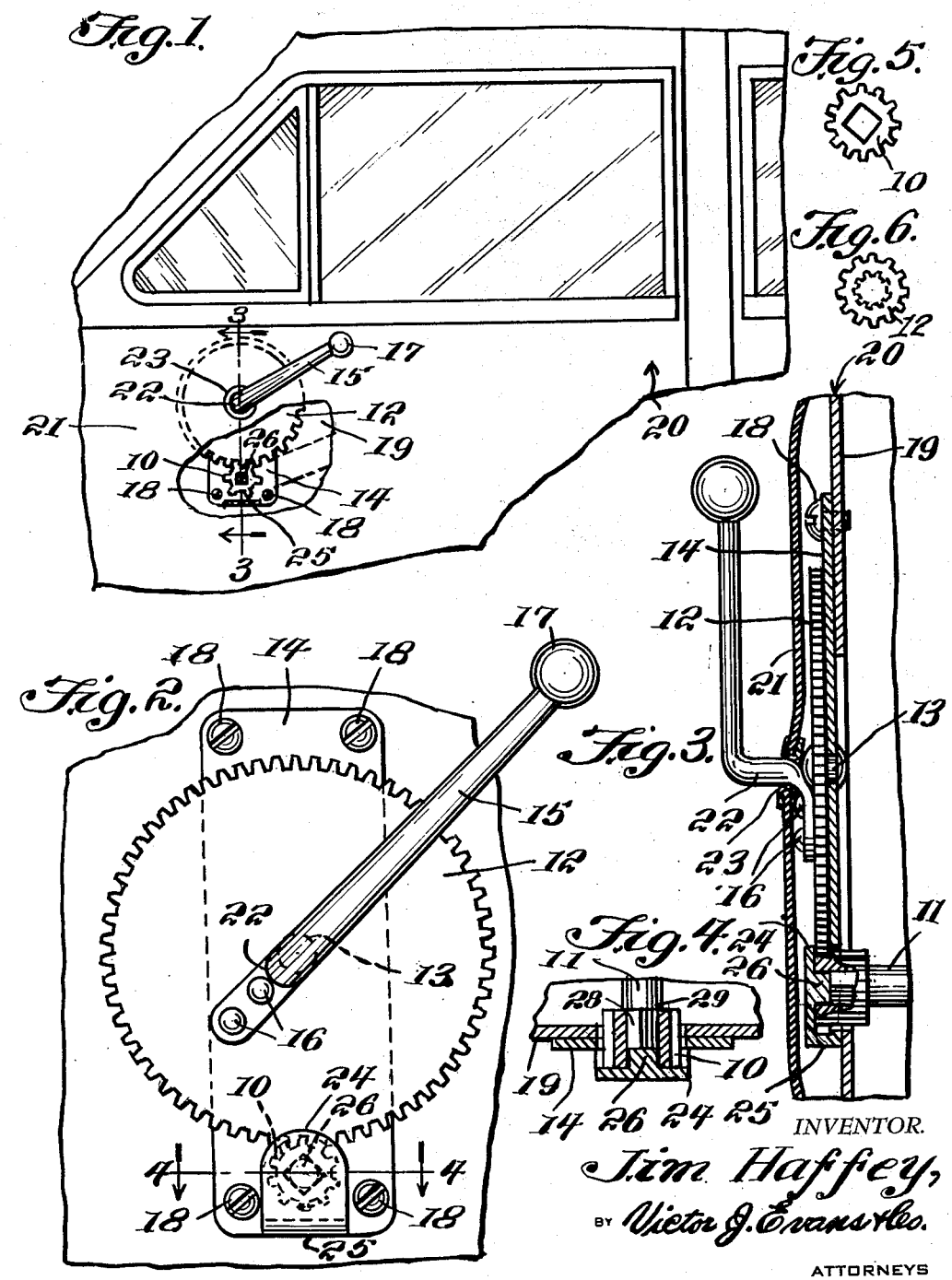

2,668,703

UNITED STATES PATENT OFFICE 2,668,703

MOTOR VEHICLE WINDOW OPERATOR

Jim Haffey, Oxford, Nebr.

Application May 27, 1952, Serial No. 290,357

4 Claims. (Cl. 268—126)

This invention relates to devices for opening and closing motor vehicle windows, and in particular a lever actuating gear journaled in a bracket mounted on a motor vehicle door and positioned to mesh with the pinion on the conventional handle shaft with which the window is raised and lowered.

The purpose of this invention is to expedite opening and closing windows of motor vehicles whereby instead of winding a crank it is only necessary to push or pull a knob on the end of a lever extended from the side of the vehicle.

With the conventional type of motor vehicle window operator, it is necessary to turn a small crank and in some vehicles it is necessary to turn the crank three revolutions in opening or closing a window. With a mail carrier serving 100 or more mail boxes considerable time is lost in opening and closing the window at each box. With this thought in mind this invention contemplates the use of a comparatively small pinion on the shaft of the window opening crank and a relatively large gear journaled on the door and meshing with the pinion whereby a small movement of the gear by a hand crank turns the pinion through a plurality of revolutions whereby a window in combination with which the device is used is opened or closed by pushing the hand lever forwardly or pulling it backwardly with the lever moving to an angle of substantially 45° in either direction.

The object of this invention is, therefore, to provide mechanical means for expediting closing and opening movements of a motor vehicle window glass.

Another object of the invention is to provide an improved motor vehicle window operator that is adapted to be installed in motor vehicles now in use without changing the design or structure thereof.

A further object of the invention is to provide auxiliary operating means adapted to be used in combination with conventional motor vehicle window operators whereby the windows may be opened and closed with comparatively short movements in which the auxiliary device is of a comparatively simple and economical construction.

With these and other objects and advantages in view the invention embodies a pinion positioned on a crank shaft of a conventional motor vehicle window operating mechanism, a gear journaled on a mounting plate on the door and positioned to mesh with the pinion, and a hand lever with a knob on the end extended from the gear and positioned to turn the gear.

Other features and advantages of the invention will appear from the following description taken in connection with the drawing, wherein:

Figure 1 is an elevational view looking toward the inner surface of a door of a motor vehicle with parts broken away and illustrating the auxiliary window operating mechanism installed behind the upholstery of the door.

Figure 2 is a view similar to that shown in Fig. 1 with the parts shown on an enlarged scale and with the outer layer of upholstery omitted.

Figure 3 is a vertical section taken on line 3—3 of Fig. 1 also showing the auxiliary door operating mechanism, and with the parts also shown on an enlarged scale.

Figure 4 is a section taken on line 4—4 of Fig. 2 illustrating the mounting of the pinion on the operating crank shaft of the conventional window operating mechanism.

Fig. 5 is a plan view of the pinion 10; and

Fig. 6 is a plan view, on a reduced scale, of the gear 12.

Referring now to the drawings wherein like reference characters denote corresponding parts the auxiliary motor vehicle window operating mechanism includes a pinion 10 adapted to be mounted on a shaft 11 of the conventional window operating mechanism, a gear 12, journaled by a pin 13 on the mounting plate 14 and a lever 15 mounted on the gear 12 with rivets 16 and having a knob 17 on an extended end thereof.

As illustrated in Fig. 3 the plate 14 upon which the gear 12 is pivotally mounted by the pin 13 is secured by screws 18 to a panel 19 of a door, as indicated by the numeral 20, with the parts positioned behind upholstery 21 and with the offset end 22 of the lever 15 extended through an opening 23 in the upholstery.

The lower end of the plate 14 is provided with a flange 24 which is connected to the lower edge of the plate with a web 25 and the flange 24 is provided with a stud 26 that extends into the bore in the pinion 10 and abuts the end of the shaft 11. The pinion 10, which is positioned on a square section 28 of the shaft 11 is retained between the flange 24 and a shoulder 29 on the shaft.

In applying the invention the conventional crank handle for the window mechanism is removed from the shaft 11. The pinion 10 is then positioned on the shaft 11 to replace the handle. Thus when gear 12 is rotated by the lever 15 the shaft 11 will be caused to rotate to operate the conventional window mechanism to cause the window to be raised and lowered.

With the parts arranged in this manner and with the diameter of the gear 12 larger than that of the pinion 10 a comparatively short movement of the knob 17 on the extended end of the lever 15 rotates the pinion 10 sufficiently to open or close a window.

It will be appreciated that the design and arrangement of the parts is only typical as the parts may be formed of different designs and arranged in different positions to correspond with the vehicle or door of a vehicle upon which the device is used.

It will also be understood that other modifications may be made in the design and arrangement of the parts without departing from the spirit of the invention.

What is claimed is:

1. A window operator comprising an elongated plate having a centrally positioned flange parallel to and spaced from one end and said flange connected to the plate with a web, said flange also having a stud on the side thereof facing the plate and abutting the end of the shaft of a window raising mechanism, a pinion mounted on the shaft of the window raising mechanism and having an opening in one end for receiving the stud positioned against the flange and extended through the plate, a gear journaled on the plate and positioned to mesh with the pinion and a handle extended from the face of the gear.

2. In a motor vehicle window operator, the combination which comprises a wall having an opening in the upper part thereof, a glass panel slidably mounted in the wall and positioned to extend across said opening of the wall, a window operating mechanism mounted in the wall and having a shaft extended therefrom for operating the glass panel, a plate mounted in the wall and positioned adjacent the shaft, said plate having a flange connected to and extended from the lower end, said flange having a stud extended therefrom, a pinion mounted on the shaft and positioned by said stud, a gear rotatably mounted on the plate and positioned to mesh with the pinion, and a lever attached to the gear providing a handle.

3. In a window operator, the combination which comprises a mounting plate having a flange spaced from one end and parallel to the plate and said flange having a stud on one surface, a shaft for a window operating mechanism positioned with the stud of the flange extended into abutting relation therewith, a pinion mounted on the shaft, a gear journaled on the plate and positioned to mesh with said pinion, and a lever attached to the face of said gear and extended beyond the gear providing a handle.

4. In a window operator, the combination which comprises a mounting plate having a flange spaced from one end and parallel to the plate and said flange having a stud on one surface, a shaft for a window operating mechanism positioned with the stud of the flange extended into abutting relation therewith, a pinion mounted on the shaft, a gear journaled on the plate and positioned to mesh with said pinion, and a lever attached to the face of said gear and extended beyond the gear providing a handle, said operating device adapted to be mounted in a door of a motor vehicle and positioned behind upholstery on the inner surface of the door.

JIM HAFFEY.

References Cited in the file of this patent
UNITED STATES PATENTS

| Number | Name | Date |
| --- | --- | --- |
| 2,070,941 | Dust | Feb. 16, 1937 |
| 2,122,661 | Righmyer | July 5, 1938 |
| 2,153,689 | Floraday | Apr. 11, 1939 |